Figure 1:
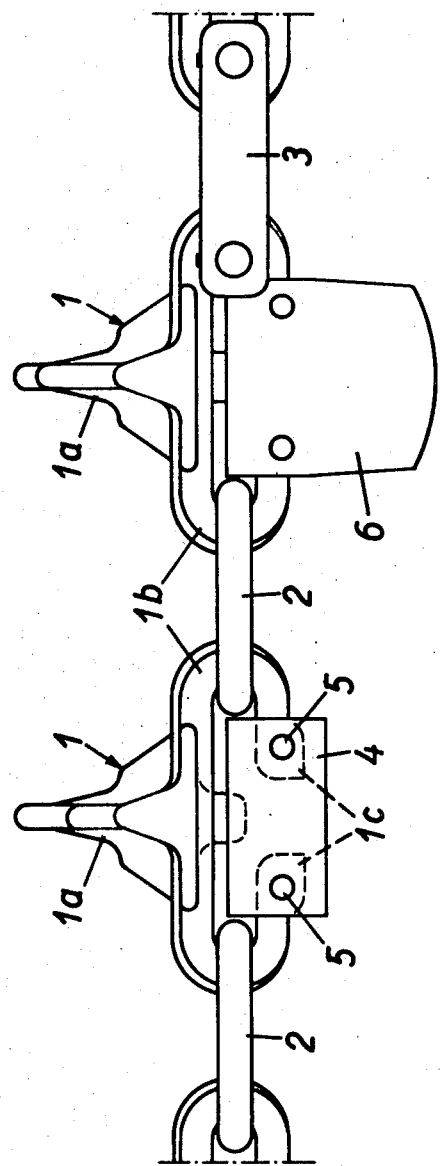

United States Patent
Carlsson

[11] 3,738,715
[45] June 12, 1973

[54] CLEAT PLATE STRUCTURES FOR CATERPILLAR BELTS

[75] Inventor: Erik Herbert Carlsson, Overum, Sweden

[73] Assignee: Aktiebolaget Overums Bruk, Overum, Sweden

[22] Filed: May 24, 1971

[21] Appl. No.: 146,278

[52] U.S. Cl. ............................................. 305/56
[51] Int. Cl. ......................................... B62d 55/28
[58] Field of Search .................. 305/56, 39, 57, 53

[56] References Cited
UNITED STATES PATENTS

| | | | |
|---|---|---|---|
| 1,360,115 | 11/1920 | Kemper | 305/39 |
| 1,780,513 | 11/1930 | Arps | 305/56 |
| 3,355,224 | 11/1967 | Skanes | 305/53 |
| 3,383,140 | 5/1968 | Stalberg | 305/39 X |

FOREIGN PATENTS OR APPLICATIONS

| | | | |
|---|---|---|---|
| 565,646 | 8/1957 | Italy | 305/56 |

Primary Examiner—Richard J. Johnson
Attorney—Johnson, Marcus & Wray

[57] ABSTRACT

The present invention relates to endless belts or chains for rubber-wheeled vehicles and provides a cleat plate structure for such belts or chains comprising very few different parts and lacking threaded bolt connections needing supervision and recurrent tightening, such bolt connections being replaced by plain bolts having a friction fit in the parts to be joined thereby.

6 Claims, 2 Drawing Figures

ERIK HERBERT CARLSSON
INVENTOR
BY Johnson Marcus&Wray
PATENT AGENTS

CLEAT PLATE STRUCTURES FOR CATERPILLAR BELTS

The present invention relates to endless belts or chains for forestry tractors and similar vehicles provided with rubber tires on their ground wheels, and has for its particular object a tractor belt cleat plate structure of the kind comprising a base portion having its greatest extension transversely of the belt and being formed at each end portion at the lateral edges of the belt with a substantially C-shaped bail member extending longitudinally of the belt, said bail member affording two hook-shaped portions for interconnecting the cleat plate structure with further plate structures to form an endless belt or chain with the aid of interposed link members.

Cleat plates of this kind are priorly known and are usually built up of a welded base portion the end portions of which are connected to the corresponding C-shaped bails by bolt means which also serve to hold a distance element for the said interposed link members disposd in each bail member.

This and similar structures suffer from the inherent weakness that the bolt connections, in spite of the provision of self-locking nut means, need perpetual vigilance and recurrent tightening to conserve a proper amount of stiffness in the belt and to prevent the falling apart of the latter in operation. It is common practice, therefore, to lock the tightened bolt connections permanently, as by welding. Whereas this effectively prevents the falling apart of the belt components, any further tightening of the bolt connections to maintain the rigidity of the belt is, of course, impossible. Further, such welding of bolt connections renders the replacement of damaged components more difficult, and this is often aggravated by the fact that such replacement must frequently be effected with the tractor standing on difficult ground where it is completely dependent on its belts being fit for operation.

It is the main object of the invention to provide a cleat plate structure for the aforementioned purpose wherein its parts will have a reliable mutual connection and an interconnection with the said link members without the provision of bolt connections and wherein the connecting members are not loaded in a dismounting direction during operation. A further object is to provide a much simplified cleat plate structure having a reduced number of elements compared with the priorly known structures, and affording a very good rigidity in the diagonal sense.

These and further objects are attained according to the invention therethrough that two channel members are provided for each said plate structure and extend with their limb portions across the end portions of said hook-shaped parts to engage by the said limb portions the sides of said hook-shaped parts, there being aligned bores through said limb portions and said end portions of said hook-shaped parts, detachable bolt members extending through said bores and liable to be subjected to radial loads only upon the tensioning of the bail member during operation of the belt.

A preferred embodiment of the invention will be described by way of example hereinafter with reference to the drawings.

In the drawings

Figure 2:
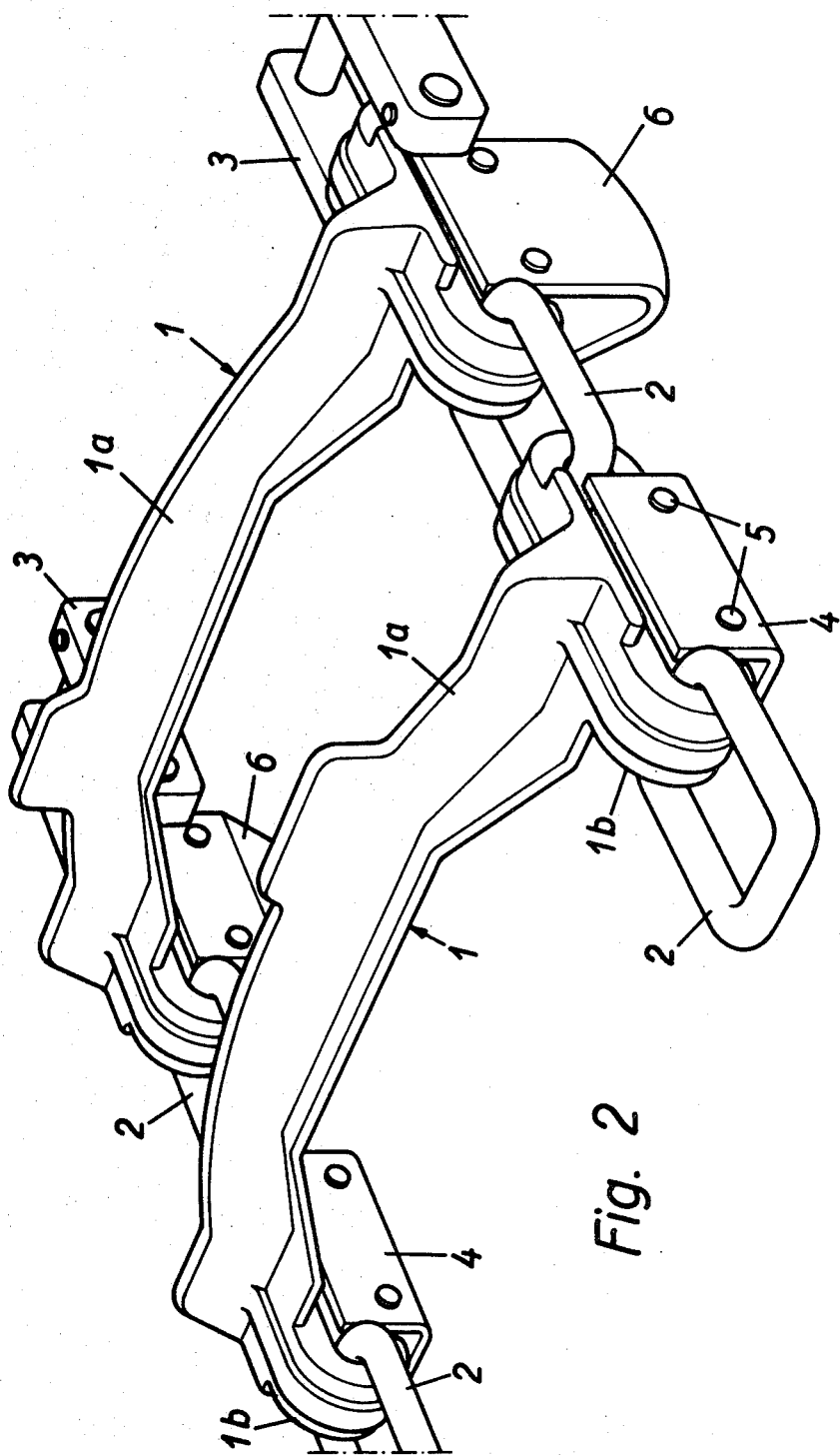

FIG. 1 is a side elevation view of part of a tractor belt or chain featuring the new cleat plate structure, and FIG. 2 is a perspective view.

As seen from the drawings each belt plate structure generally denoted 1 has a base portion or cleat member 1a extending transversely of the belt and formed at each end portion at the lateral edge of the belt with an essentially C-shaped bail member 1b extending longitudinally of the belt. The base portion 1a is a steel casting integral with both bail members 1b.

Each C-shaped bail member 1b, which has its open portion facing downward in the illustrated position of the cleat plates, forms two hook-shaped parts destined for joining a plurality of plates to a belt or chain by means of interposed link members 2 of a known type. At one or more points along the belt the plates 1 are interconnected by means of special joining links 3, instead, such links also being of a type known in itself. These links are provided to render the mounting and dismounting of the belt on the vehicle easy.

The joining links 3 can be mounted laterally by having at least one detachable side member whereby the link can be pushed home from the inner or outer side of the belt. The other link members 2 are mounted on the assembly of the belt and are normally not detached from the belt unless damaged parts are to be replaced. These link members 2 are retained in their operative positions by means of an essentially U-shaped or channel member 4 provided for each bail 1b. As illustrated these U-members extend with their limbs upward from the web over both free ends 1c of the bail and prevent the link members 2 from longitudinal displacement relative to the cleat plates. The channel limbs are connected to these bail ends by means of plain bolt members 5 extending transversely of the belt through aligned bores in the U-limbs and the bail ends 1c. The bolts 5 which are not subjected to axial loads in operation are shaped and dimensioned for being retained by friction in their mounted position. Threaded connections need thus not be provided in the new structure. This is important with regard to the ability of the belt to stand up to sustained operation with very little need for inspection and maintenance.

At uniform intervals along the belt the U-members 4 may be replaced by a modified structure 6 having an essentially V-shaped cross section and longer limb portions. The limb portions of the members 6 will extend across at least part of the side walls of the rubber tires to form complementary guide means for the belt to prevent the latter from losing its engagement with the vehicle wheels during hard operation. The modified members 6 can be provided at each, every second, every third etc. cleat plate, as necessary. Since these modified members 6 replace the regular channel members 4, a complete cleat plate structure will not in any case comprise more different parts than three, viz. one plate 1, two members 4 or 6, and four bolts 5. This compares very favorably with priorly known structures as the number of parts will be only the half or less of those of the latter.

The invention is not restricted to the embodiment described and illustrated but can be varied as to its details within the scope of the annexed claims.

What I claim is:

1. A plate structure for endless belts of wheeled vehicles such as forestry tractors or the like comprising:
   a. a cleat member having its principal extension extending transversely of the length of the belt, an essentially C-shaped bail member integrally formed with said cleat member at each end thereof, each of said C-shaped bail members extending longitudinally of the belt with the open portion of the C opening in a direction away from the cleat ground-engaging surface portion providing two hook-shaped terminal parts for connecting the cleat plate structure to a like structure by means of link members joining said hook-shaped parts;

b. a channel-like member for each of said C-shaped bail members receiving an end portion of the two hook-shaped terminal parts and traversing the opening of the C-shaped bail, aligned bores through limb portions of the channel member at each of opposite ends thereof, apertures in the terminal ends of respective ones of the two hook-shaped terminal parts aligned with the bores respectively at opposite ends of the channel; and c. detachable bolt members extending through said bores and respective apertures in the bail members detachably securing the channel member to respective ones of the C-shaped bail members.

2. A cleat plate structure as claimed in claim 1 wherein said bolt members are a friction fit in their respective bores.

3. A cleat plate structure as claimed in claim 1 wherein the said channel members have limb portions of a length sufficient to limit in an assembled belt the displacements of the said link members relative to the cleat plate structure proper.

4. A cleat plate structure as claimed in claim 1 wherein at least some of the said channel members have limb portions of sufficient length to extend at least partly across the side walls of a vehicle tire when the belt is mounted on such vehicle.

5. A cleat plate structure as claimed in claim 4 wherein said channel members are modified into a V-shape cross section.

6. An endless belt for rubber wheel vehicles such as forestry tractors assembled of cleat plate structures as claimed in claim 1 interconnected by link members between each of adjacent pairs of the plate structures.

* * * * *